(12) United States Patent
Nennerfelt et al.

(10) Patent No.: US 6,998,466 B2
(45) Date of Patent: Feb. 14, 2006

(54) PROCESS FOR EXTRACTING FLAX PROTEIN CONCENTRATE FROM FLAX MEAL

(75) Inventors: Leif Nennerfelt, Bellingham, WA (US); David Evans, Custer, WA (US); Willie Ten Haaf, Langley (CA)

(73) Assignee: Nutrex Wellness, Inc., (CA)

( * ) Notice: Subject to any disclaimer, the term of this patent is extended or adjusted under 35 U.S.C. 154(b) by 247 days.

(21) Appl. No.: 10/722,124

(22) Filed: Nov. 26, 2003

(65) Prior Publication Data

US 2004/0137133 A1 Jul. 15, 2004

Related U.S. Application Data

(60) Provisional application No. 60/428,940, filed on Nov. 26, 2002.

(51) Int. Cl.
*C07K 1/36* (2006.01)
*A23J 1/14* (2006.01)

(52) U.S. Cl. .............. 530/344; 436/656; 436/431; 436/442; 436/443

(58) Field of Classification Search .............. None
See application file for complete search history.

(56) References Cited

U.S. PATENT DOCUMENTS

| 5,844,086 A | 12/1998 | Murray | |
|---|---|---|---|
| 5,925,401 A | 7/1999 | Kankaanpaa-Anttila | |
| 2003/0109679 A1 * | 6/2003 | Green et al. | 530/370 |
| 2005/0058756 A1 * | 3/2005 | Green et al. | 426/489 |
| 2005/0107593 A1 * | 5/2005 | Green et al. | 530/377 |

* cited by examiner

*Primary Examiner*—Robert A. Wax
(74) *Attorney, Agent, or Firm*—Hall, Vande Sande & Pequignot

(57) ABSTRACT

A process for extracting flax protein concentrate from flax meal is disclosed wherein flax meal is added to an aqueous acidic solution to form a first mixture having a solid fraction and an aqueous fraction containing water soluble-carbohydrates. The mixture is separated and the solid fraction is then hydrolyzed using a lipolytic enzyme. An aqueous alkali solution is then added to the hydrolyzed solution to form a second mixture having a second aqueous fraction containing said flax protein, and a second solid fraction. The second mixture is then separated into the aqueous fraction and the solid fraction, such that the second aqueous fraction may be evaporated to recover the flax protein.

10 Claims, 1 Drawing Sheet

PROCESS FOR EXTRACTING FLAX PROTEIN CONCENTRATE FROM FLAX MEAL

RELATED APPLICATIONS

This application claims the benefit of prior filed provisional application, Application No. 60/428,940, filed Nov. 11, 2002.

FIELD OF THE INVENTION

The present invention is a process for extracting flax protein concentrate from flax meal.

BACKGROUND OF THE INVENTION

Protein with nutritious, health and functional aspects have become a very important segment of the food industry in the last decade as the understanding of the benefits of the right type and amount of protein in ones diet has become better understood. Traditional sources of protein have been egg, whey and plant based proteins such as soy. As protein supplementation finds its way into a greater variety of foods, the demand for unique nutritional and functional qualities in proteins has increased. The health food industry has acknowledged the benefits of flax for quite some time. Traditionally the entire flaxseed has been used in variety of food applications, and more recently the flax oil has been extracted by a method of cold press, which maintains the integrity of the nutritional benefits of the oils. The byproduct of this cold press is either discarded or sold as flax meal into feed applications. Flax meal is a flake-like material that is produced as a byproduct of cold-pressing flaxseed to produce flax oil. Flax meal contains approximately 36% protein, 10% fat, 9% moisture, 5% ash, and the balance carbohydrate.

The extraction of flax protein concentrate from flax meal presents problems that are unique to extracting protein from oilseeds. In the past, extracting flax protein from flax meal has been difficult as flax meal is highly viscous when solubilized making it very difficult to process. Accordingly, as the demand for unique proteins increases, there is a need for a commercially practical process to extract flax protein concentrate from flax meal.

BRIEF SUMMARY OF THE INVENTION

It is an object of the present invention to provide a commercially practical process to extract flax protein concentrate from flax meal. Flax meal is a flake-like material that is produced as a byproduct of cold-pressing flaxseed to produce flax oil. Flax meal contains approximately 36% protein, 10% fat, 9% moisture and the balance carbohydrate.

The present invention is a process for extracting flax protein concentrate from flax meal wherein flax meal is added to an aqueous acidic solution to form a first mixture having a solid fraction and an aqueous fraction containing water soluble-carbohydrates. The mixture is separated and the solid fraction is then hydrolyzed using a lipolytic enzyme. An aqueous alkali solution is then added to the hydrolyzed solution to form a second mixture having a second aqueous fraction containing the flax protein, and a second solid fraction. The second mixture is then separated into the second aqueous fraction and the second solid fraction, such that the second aqueous fraction may be evaporated to recover the flax protein.

The aqueous acidic solution is used to remove the water-soluble carbohydrates from the flax meal. Advantageously, by first removing the water-soluble carbohydrates the viscosity of the solubilized flax meal is substantially reduced, to enable the successful extraction of the flax protein. Initially removing the water-soluble carbohydrates also reduces the contamination of the protein extract.

Following separating of the first mixture, the solid fraction may be washed with water and separated to remove more of the water-soluble carbohydrates from the solid fraction into the aqueous fraction.

The hydrolization of the mixture using a lipolytic enzyme removes the lipids that are bound to the proteins, which contributes to a high yield of flax protein concentrate to be recovered.

The aqueous alkaline solution is used to extract the protein. A relatively water insoluble base, such as calcium hydroxide, is preferable as it binds to water-soluble carbohydrates to prevent contamination of the protein extract in the aqueous fraction.

Following separating of the second mixture, the second solid fraction may be washed with water and separated to remove more of the flax protein from the second solid fraction into the second aqueous fraction.

The flax protein may be recovered by spray drying the second aqueous fraction.

The aqueous fraction and the second solid fraction that are discarded in the process contain mainly water-soluble carbohydrates, and insoluble carbohydrates respectively, and are of nutritional value.

DETAILED DESCRIPTION OF THE INVENTION

Figure 1:
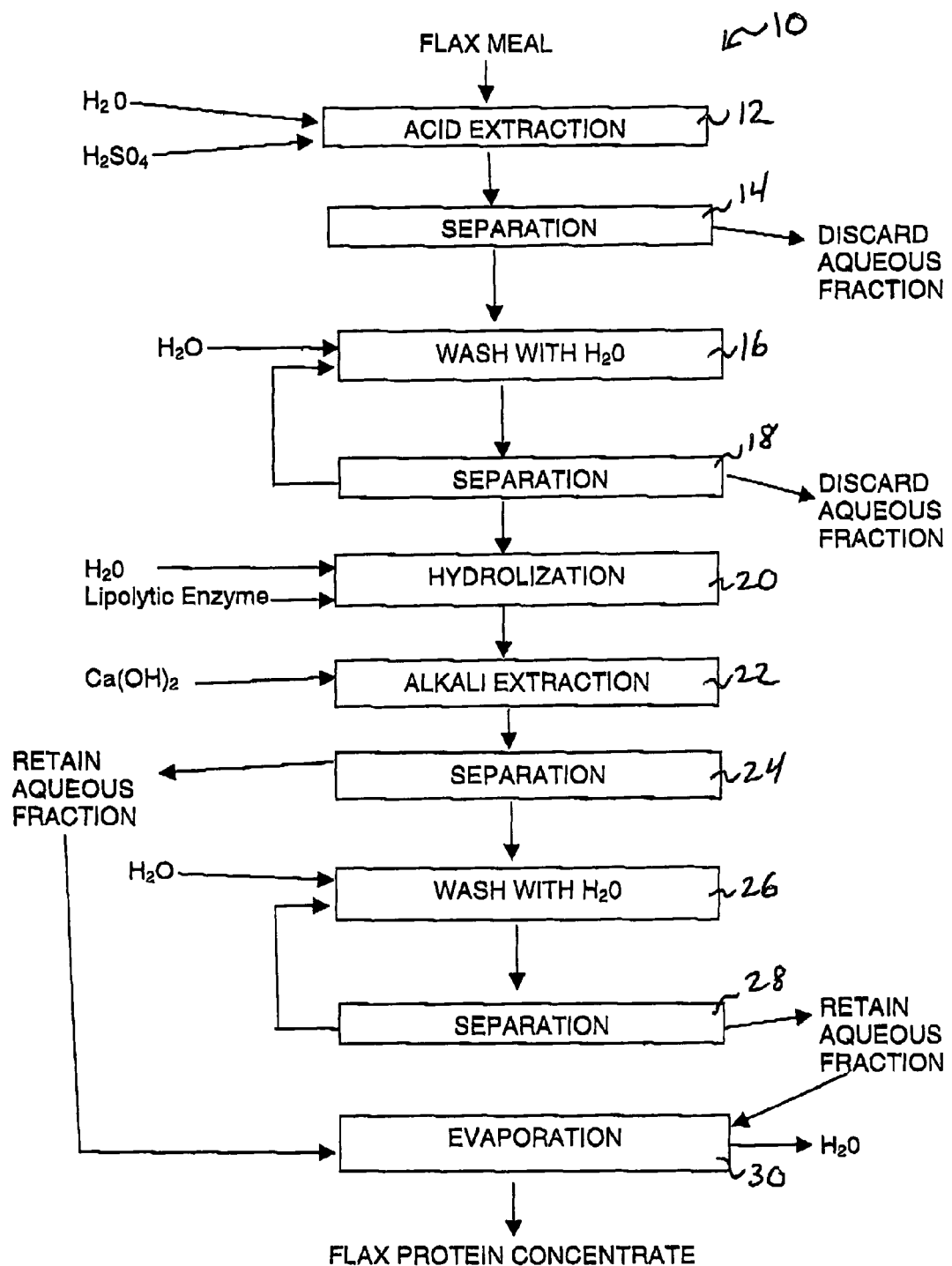
FIG. 1 is an illustrated block diagram of the procedure for extracting flax protein concentrate from flax meal.

Referring to FIG. 1, a block diagram of the process 10 of extracting flax protein concentrate from flax meal.

The first portion of the process is directed toward the separation of the water-soluble carbohydrates from the water-soluble protein in the flax meal. The removal of a majority of the water-soluble carbohydrates reduces the viscosity of the solubilized flax meal.

The first step of the first portion of the process is an acid extraction 12. For the acid extraction, acid is added to cold water, the temperature of which is for instance about 10° C. to 15° C. (50 to 60° F.), in a processing tank to lower the pH, preferably to less than 2. Preferably sulfuric acid is used, however, any acid such as hydrochloric, phosphoric and acetic may be used to lower the pH of the water.

The flax meal is then added to the acidic water and the mixture is stirred for approximately one hour. The acid should be added in a sufficient amount so that after the addition of the flax meal, the pH of the resulting mixture is between 4 and 5. The solids concentration of this mixture is 4% to 12%, however preferably approximately 6%. It is preferable that the mixture has a uniform consistency with no lumps. Under the acidic condition present during the carbohydrate extraction, a majority of the flax proteins remain insoluble and are contained in the insoluble fraction, and the water-soluble carbohydrates are in the aqueous fraction.

The mixture is then separated 14 into an aqueous fraction and an insoluble fraction. Centrifugation is the preferred method of separation 14, however, any method that is capable of producing an aqueous fraction, which is relatively free from the insoluble fraction, will be sufficient, for example belt press dewatering. It is preferable, however not essential, that the method of separation produces an insoluble fraction that contains at least 10% solids. The aqueous fraction contains primarily extracted water-soluble carbohydrates, and the insoluble fraction contains insoluble carbohydrates, some water-soluble carbohydrates, protein, and residual lipids.

After the mixture is separated 14, the aqueous fraction, which contains a fraction of water-soluble carbohydrates, may be discarded.

The insoluble fraction is then washed 16 in order to extract additional water-soluble carbohydrates. The insoluble fraction is washed 16 by mixing the insoluble fraction with a sufficient amount of cold water to bring the solids concentration down to between 4% and 12%, however preferably between 5% and 7%. The preferred range of solid concentration can usually be obtained by mixing the undissolved solids with an equal amount of water (w/w). This mixture is then agitated for fifteen minutes or until a uniform mixture is obtained.

The mixture is then separated 18 into an aqueous fraction and an insoluble fraction by a separation method, such as centrifugation as discussed with respect to separation 14. Similarly, to separation 14, the aqueous fraction containing water-soluble carbohydrates is disposed of and the insoluble fraction is retained for further processing. Although, one wash is sufficient, the insoluble fraction may be effectively washed 16 and separated 18 as many times as desired so long as the wash water remains cold and acidic.

The second portion of the process involves, extracting the water-soluble proteins from the insoluble fraction(s) that have been retained in the first portion of the process.

The first step of the second portion of the process is hydrolyzing 20 emulsified esters of glycerol and long chain fatty acids in the insoluble fraction using a lipolytic enzyme. To hydrolyze 20, the insoluble fraction is mixed with a sufficient amount of water to bring the solids concentration down to between 4% and 12%, preferably to between 6% and 8%. The quantity of the enzyme used, as well as the temperature, and pH level of the mixture is then optimized with respect to the particular enzyme(s) used to hydrolyze the lipids. For example, Lipase 30 is active at a pH between 6.0 and 6.5 and temperature between 35° C. and 45° C. (95 and 113° F.). Accordingly, if Lipase 30 is to be used to hydrolyze the lipids the resulting mixture should be stirred and heated to a temperature between 35° C. and 45° C. (95 and 113° F.), and the pH increased to between 6.0 and 6.5. A quantity of Lipase 30 equal to 0.5% of the original weight of the flax meal is sufficient. The pH may be increased by adding a 20% solution of sodium hydroxide (NaOH), or other basic reagent to the water.

The mixture is stirred for approximately two hours to enable the lipid hydrolysis to complete, and the temperature and pH are maintained within the ranges stated to be optimal for the enzyme that is used.

At the end of the hydrolization period, an alkali extraction 22 is used to separate the water-soluble proteins from the insoluble-carbohydrates. For the alkali extraction, the pH of the mixture is raised to between 7 and 10.5, however preferably between 8.0 and 10.0, by adding a 10% slurry of calcium hydroxide ($Ca(OH)_2$) or other suitable base, such as magnesium hydroxide, in water. The mixture is then heated to a temperature between 55° C. and 75° C. (131 and 167° F.).

The mixture is then separated 24 into an aqueous fraction and an insoluble fraction. Preferably the mixture is separated by centrifugation, however, as discussed with respect to separations 14 and 18, any method that is capable of producing an aqueous fraction, which is relatively free from insoluble material, will be sufficient.

After the mixture is separated, the aqueous fraction containing the extracted proteins is retained. The insoluble fraction is then washed 26 to extract additional protein.

To wash 26, the insoluble fraction is mixed with an equal amount of warm water (w/w), and stirred for 10–15 minutes or until a uniform mixture is obtained such that more of the protein may be brought into the aqueous fraction. The mixture is then separated 28 into an aqueous fraction and an insoluble fraction by a separation method, such as centrifugation as discussed above. Similarly, to the previous separating step 24, the aqueous fraction that contains the proteins is retained, and the insoluble fraction is discarded. The insoluble fraction contains mainly insoluble carbohydrates. Although one wash is effective, the wash 26 and separation 24 may be repeated as may times is desired so long as the wash water is warm and basic.

The extracted proteins may then be recovered by evaporating 30 the water from the aqueous fraction(s). Preferably, the aqueous fraction, which contains the extracted proteins, may be spray dried to give a protein concentrate powder, however, other methods may be used including freeze drying or pan drying.

The procedure is known to produce a flax protein concentrate containing 70% protein and is estimated to achieve up to 90% protein under optimal conditions.

Set forth hereafter is examples, which are only intended to illustrate the present invention, the examples are not intended in any way to limit the scope of the invention.

EXAMPLE 1

Extraction of Flax Protein

Protein was extracted from flax meal, which is a flake-like material that is produced as a byproduct of the cold-pressing flaxseed to produce flax oil. This material contains approximately 36% protein, 10% fat, 9% moisture and the balance carbohydrate.

5.6 grams of flax meal was added to 74.4 ml of a 0.1% solution of sulfuric acid in water. The mixture was stirred at room temperature for 1 hour. At the end of 1 hour, the pH was measured and found to be 4.45. This mixture was centrifuged for 15 minutes using 2000 g. The supernatant, which contained soluble polysaccharides along with small amounts of fat, protein and ash, was discarded. The insoluble material remaining after centrifugation was re-extracted by adding water to a total volume of 80 ml, stirring the mixture for 15 minutes, and then centrifuging. Again, the supernatant was discarded.

The insoluble material from the previous step was mixed with water to bring the total volume to 80 ml, and the pH was raised to 6.5 using a 20% solution of NaOH. Then, 0.11 grams Lipase 30 (American Laboratories) was added. The mixture was stirred and incubated at a temperature of 105° F. for 45 minutes.

At the end of the digestion period, the pH of the mixture was raised to 9.7 using a 10% slurry of calcium hydroxide in water. The mixture was heated to 140° F., incubated for 15 minutes and centrifuged for 3–4 minutes using 2000 g. The supernatant, which contains the extracted flax protein, was retained. The insoluble material was re-extracted by adding warm water (140° F.) to a total volume of 80 ml. The mixture was stirred for 15 minutes, and once again centrifuged. This supernatant was combined with the previous supernatant. On analysis, this solution was found to contain 1.73% solids, of which 70.9% was protein. Sixty-seven percent of the protein originally present in the flax meal was extracted in this test.

EXAMPLE 2

Extraction of Flax Protein

About 800 pounds of cold water was placed in a processing tank and 334 g of concentrated $H_2SO_4$ was added to the water. Then, 50 pounds of flax meal was added to the water and the mixture was stirred for 1 hour. The flax/water mixture was pumped through a bowl-and-disk centrifuge to produce an aqueous fraction, and a semi-solid fraction containing insoluble material (sludge). The aqueous fraction containing extracted carbohydrates was discarded. The sludge was returned to the empty processing tank and mixed with approximately 500 pounds of cold water. This mixture was stirred for about 15 minutes and then centrifuged in the same manner as before in order to extract additional carbohydrate. Once again the aqueous fraction was discarded, and the sludge saved for further processing.

About 300 pounds of warm water was added to the sludge from the previous step. The mixture was stirred and a sufficient amount of a 20% NaOH solution was added to bring the pH to 7.0. The mixture was heated to 105–110° F., and 75 g of Lipase 30 and 75 g of Lipase 15 (American Laboratories) were added. The mixture was stirred and the temperature was maintained within the stated range for 2 hours. At the end of two hours, the pH of the mixture was raised to about 9.5 by adding a mixture of calcium hydroxide in water, and the temperature was raised to 140° F. The mixture was centrifuged, and the aqueous phase (which contained the extracted flax protein) was pumped to a holding tank. After centrifuging, the sludge was returned to the processing tank and mixed with about 300 pounds of warm water in order to extract additional protein from it. Again, the mixture was centrifuged and the aqueous phase (containing additional extracted flax protein) was pumped to the holding tank for spray-drying.

A compositional analysis of the spray-dried material gave the following results:
Protein: 68.0% (70.5% dry basis)
Fat: 1.8%
Ash: 18.2%
Moisture: 3.6%
Carbohydrate: 8.4%

EXAMPLE 3

Extraction of Flax Protein

To 160 ml water were added 0.14 grams concentrated sulfuric acid and 10 grams flax meal. The mixture was stirred at room temperature for 1 hour, at which time the pH was measured and found to be 4.78. The mixture was centrifuged for 15 minutes using 2500 g, and the supernatant discarded. Water was added to the insoluble matter to bring the total weight to 160 grams. This mixture was stirred for 15 minutes until uniform. The mixture was centrifuged again and the supernatant was discarded.

Water was added to the insoluble matter from the previous step to bring the total weight to 160 grams. The pH of the mixture was raised to 7.0 using a 20% solution of NaOH. The mixture was heated with stirring to a temperature of 100° F., and 0.08 gram Lipase 30 (American Laboratories) was added. The pH was maintained above 6.0 by adding additional NaOH as needed during the 2 hour digestion period. After 2 hours, temperature was raised to 140° F. and the pH was raised to 8.70 using a slurry of magnesium hydroxide in water. This mixture was centrifuged for 5 minutes using 2500 g. The supernatant, containing the flax protein, was saved, and the insoluble matter was re-extracted to obtain additional protein. The insoluble matter was mixed with hot water (140° F.) to a total weight of 160 grams, stirred for 15 minutes, and centrifuged. This supernatant was combined with the previous supernatant, and analyzed for solids and percentage protein. The solution was found to contain 1.70% solids, with 71.5% of the solids being protein.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A process for extracting flax protein concentrate from flax meal, which comprises:
    a) adding flax meal to an aqueous acidic solution to form a first mixture having a solid fraction and an aqueous fraction containing water soluble-carbohydrates;
    b) separating said first mixture into said aqueous fraction and said solid fraction;
    c) hydrolyzing said solid fraction using a lipolytic enzyme to form a hydrolyzed solution;
    d) adding an aqueous alkali solution to said hydrolyzed solution to form a second mixture having a second aqueous fraction containing said flax protein, and a second solid fraction;
    e) separating said second mixture into said aqueous fraction and said solid fraction; and
    f) evaporating said second aqueous fraction to recover said flax protein.

2. The process as defined in claim 1, wherein said first mixture has a pH of between 4 and 5.

3. The process as defined in claim 1, wherein said separating of said first mixture is done by centrifuging.

4. The process as defined in claim 1, wherein following separating of said first mixture, said solid fraction is washed with water and separated to remove more of said water-soluble carbohydrates from said solid fraction into said aqueous fraction.

5. The process as defined in claim 1, wherein said second mixture in said hydrolyzing step is stirred for 2 hours.

6. The process as defined in claim 1, wherein said aqueous alkali extraction is one of calcium hydroxide in water, and magnesium hydroxide in water.

7. The process as defined in claim 1, wherein following separating of said second mixture, said second solid fraction is washed with water and separated to remove more of said protein from said second solid fraction into said second aqueous fraction.

8. The process as defined in claim 1, wherein said evaporating of said second aqueous fraction is done by spray drying.

9. A process for extracting flax protein concentrate from flax meal, comprising:
    a) removing water-soluble carbohydrates from the flax meal;
    b) hydrolyzing the flax meal using a lipolytic enzyme to remove lipids that are bound to the protein of the flax meal; and
    c) recovering the protein.

10. The process as defined in claim 9, wherein said water-soluble carbohydrates are removed by adding the flax meal into an aqueous acidic solution.

* * * * *